United States Patent
Dudar et al.

(10) Patent No.: US 10,322,719 B2
(45) Date of Patent: Jun. 18, 2019

(54) VEHICLE REPOSITIONING SYSTEM

(71) Applicant: Ford Global Technologies, LLC, Dearborn, MI (US)

(72) Inventors: Aed M. Dudar, Canton, MI (US); Scott A. Bohr, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/259,172

(22) Filed: Sep. 8, 2016

(65) Prior Publication Data

US 2018/0065624 A1 Mar. 8, 2018

(51) Int. Cl.
| | |
|---|---|
| *B60W 30/06* | (2006.01) |
| *G05D 1/00* | (2006.01) |
| *G07B 15/02* | (2011.01) |
| *G08G 1/14* | (2006.01) |
| *G08G 1/09* | (2006.01) |
| *G08G 1/0967* | (2006.01) |

(52) U.S. Cl.
CPC ............ *B60W 30/06* (2013.01); *G05D 1/0011* (2013.01); *G05D 1/0088* (2013.01); *G07B 15/02* (2013.01); *G08G 1/09675* (2013.01); *G08G 1/096716* (2013.01); *G08G 1/096741* (2013.01); *G08G 1/096775* (2013.01); *G08G 1/096783* (2013.01); *G08G 1/143* (2013.01); *G08G 1/144* (2013.01); *G08G 1/145* (2013.01); *G08G 1/148* (2013.01); *B60W 2550/40* (2013.01); *B60W 2600/00* (2013.01); *G05D 2201/0213* (2013.01)

(58) Field of Classification Search
CPC ............ B60W 30/06; B60W 2550/40; B60W 2600/00; G08G 1/145; G08G 1/144; G07B 15/02; G05D 1/0088
See application file for complete search history.

(56) References Cited

U.S. PATENT DOCUMENTS

| | | | |
|---|---|---|---|
| 8,138,950 B1 | 3/2012 | Leung | |
| 8,922,393 B2 | 12/2014 | Ricci | |
| 9,773,413 B1* | 9/2017 | Li | ............... G08G 1/141 |
| 2003/0076417 A1* | 4/2003 | Thomas | ............. G07B 15/02 |
| | | | 348/169 |
| 2012/0092190 A1* | 4/2012 | Stefik | ............... G06Q 10/02 |
| | | | 340/932.2 |
| 2015/0149265 A1 | 5/2015 | Huntzicker et al. | |
| 2015/0221142 A1 | 8/2015 | Kim et al. | |

(Continued)

FOREIGN PATENT DOCUMENTS

WO 2017077857 A1 5/2017

OTHER PUBLICATIONS

Search Report dated Jan. 18, 2018 from the United Kingdom Intellectual Property Office regarding GB Application No. 1713891.8 (5 pages).

*Primary Examiner* — Rodney A Butler

(74) *Attorney, Agent, or Firm* — Frank A. MacKenzie; Bejin Bieneman PLC

(57) ABSTRACT

A vehicle system to reduce parking tickets is described. The vehicle system includes a communication interface that receives vehicle operator preferences regarding ticketing risk and parking preferences. A processing device calculates an instruction signal which is sent to an autonomous mode controller. The autonomous mode controller moves the vehicle to a pick up location or a new parking spot as a function of the instruction signal.

7 Claims, 3 Drawing Sheets

(56) References Cited

U.S. PATENT DOCUMENTS

| | | |
|---|---|---|
| 2015/0241241 A1 | 8/2015 | Cudak et al. |
| 2015/0329110 A1 | 11/2015 | Stefan |
| 2016/0012726 A1* | 1/2016 | Wang ................... G08G 1/0112 340/932.2 |
| 2016/0071172 A1 | 3/2016 | Shangguan |
| 2016/0167653 A1* | 6/2016 | Malone ................ B60W 10/18 701/23 |
| 2016/0318516 A1* | 11/2016 | Tuukkanen ........... B60W 30/09 |
| 2017/0004710 A1* | 1/2017 | Dozono ................. G08G 1/144 |
| 2017/0166115 A1* | 6/2017 | Pal ........................ G08G 1/163 |
| 2017/0267233 A1 | 9/2017 | Minster et al. |
| 2018/0203451 A1* | 7/2018 | Cronin .................... G05D 1/02 |

* cited by examiner

VEHICLE REPOSITIONING SYSTEM

BACKGROUND

Metered or time based paid parking can create disruption for some vehicle operators when the metered parking is set to expire. Vehicle operators are faced with the choice of risking a parking ticket for an expired meter or disrupting an activity to either put more money in the meter or move the vehicle.

DETAILED DESCRIPTION

Figure 1:
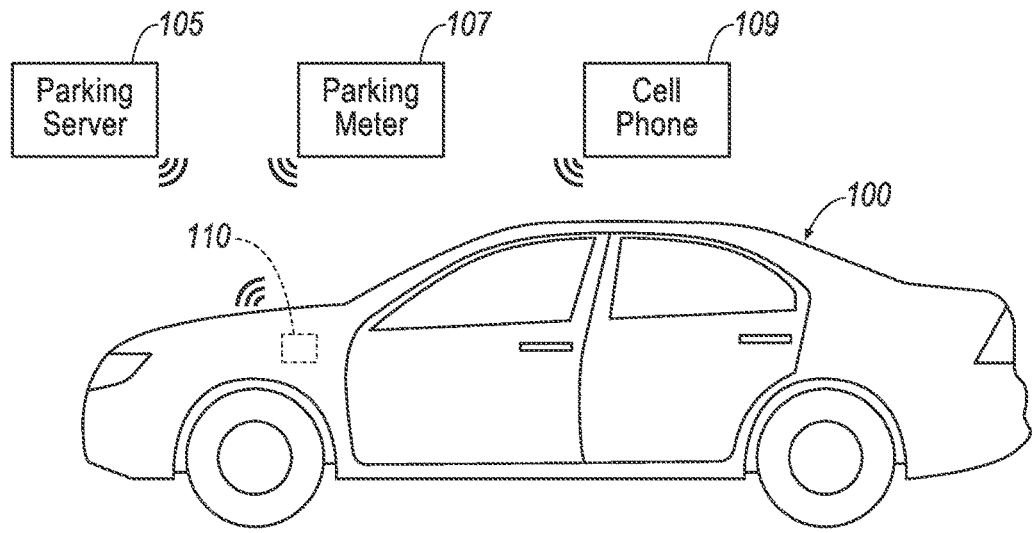
FIG. 1 illustrates an example vehicle able to receive parking information from a parking server and a parking meter.

One way to reduce the aggravation and risk of receiving a parking ticket is to provide a vehicle system that receives information regarding when a parking meter or parking time is set to expire. If more time is available on the meter, the vehicle system may communicate with a sufficiently equipped parking meter to pay for more time. A vehicle operator can provide information to the system so that the system can determine an acceptable risk level for receiving a ticket when more time is not available for purchase. The risk assessment calculated by the vehicle system can take into account factors such as whether the time is set to expire during peak parking hours; whether the weather is inclement; whether other nearby parking meters are also set to expire; whether other vehicles are being ticketed, as referenced by a parking app such as FordPass and whether it is a high demand parking period. High demand parking periods may include sporting events or special holiday events. A processing device including memory is provided to generate an instruction signal that can be sent to an autonomous mode controller.

When a parking spot is set to expire a vehicle operator can elect to risk receiving a ticket despite high risk factors. If the vehicle operator desires to avoid a ticket the vehicle operator can alert the vehicle system via a cell phone communication when the vehicle operator expects to depart. If the expected departure time is less than a predetermined threshold, for example 10 minutes, the vehicle system may send an instruction signal to an autonomous mode controller to circle the vehicle in an autonomous driving mode so that the vehicle arrives to a pickup point to pick up the vehicle operator. The autonomous mode controller includes a processor and interfaces with the engine control, braking, and steering functions of the vehicle. When the departure time exceeds the time threshold the vehicle system may interface with a parking server to identify a new parking space and the processing device can generate an instruction signal to the autonomous mode controller to direct the vehicle to the new parking location. The vehicle operator can provide preferences based on cost or location for the new parking location.

A vehicle system 110 incorporated into a vehicle receives parking information and user ticketing risk information via a communication interface 125 and a user interface device 115. An exemplary vehicle system includes a number of components such as a communication interface 125, a user interface device 115, a navigation system 120, a processing device 130 and an autonomous mode controller 135. When a meter is set to expire, the meter communicates with the vehicle system. If no further time may be added to the meter, the processing device 130 generates an instruction signal to the autonomous mode controller 135. The instruction signal may include an instruction to circle the vehicle to pick up the vehicle operator or move to a new parking location. The autonomous mode controller 135 interfaces with actuators, the vehicle throttle, vehicle steering and vehicle braking functions to drive the vehicle.

The systems shown in the Figures may take many different forms and include multiple and/or alternate components and facilities. The exemplary components illustrated are not intended to be limiting. Indeed, additional or alternate components and/or implementations may be used.

As illustrated in FIG. 1, a vehicle 100 is in communication with a parking server 105 and a parking meter 107. The vehicle 100 may also be in communication with a vehicle operator cell phone 109. The parking meter 107 may communicate information regarding when the meter is set to expire and whether additional time is available. Parking meter 107 may include sensors to determine whether a vehicle is in the parking space as well as communication interfaces that may communicate with a parking server 105 or vehicle system 110. The parking server 105 may be configured to collect data from a number of different participating vehicles and may be configured to communicate with a number of different parking meters. The parking server 105 may communicate information regarding meter expiration, the availability of additional time and the availability of other parking spaces to the vehicle system 110 and/or the vehicle operator via vehicle operator cell phone 109. The data from the parking server 105 may indicate how many parking spaces are available including the cost and relative location of the parking spaces and may provide an indication of whether other vehicles in the area associated with meters are receiving tickets. The parking server 105 includes data regarding meters with time remaining but no vehicles present. In the event that the processing device 130 receives an instruction signal to move to a new parking location in order to avoid a ticket, the parking server 105 generates a message to the vehicle system 110 that identifies available parking locations. The processing device may then select a parking location depending upon vehicle operator preferences. The processing device 130 communicates with navigation system 120 and autonomous mode controller 135 to affect any instructions to move the vehicle 100.

Figure 2:
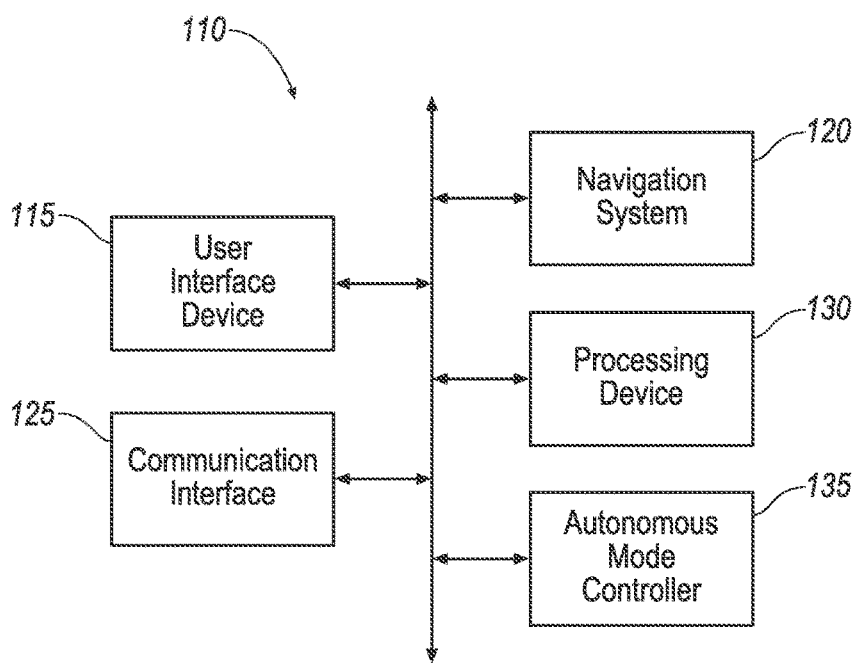
FIG. 2 is a block diagram of an example vehicle system that may be used with the vehicle of FIG. 1.

FIG. 2 is a block diagram of an example vehicle system 110 that may be incorporated into the vehicle 100. In general, the vehicle system 110 facilitates the communication with the parking meter 107, parking server 105 and cell phone 109. The vehicle system 110 can include a user interface 115, a navigation system 120, a communication interface 125, a processing device 130 and an autonomous mode controller 135. Some or all of these components may be incorporated into the vehicle 100 infotainment system. Alternatively, some or all of the components may be incorporated into one or more standalone devices in communication with one another. For instance, the user interface device 115 and navigation system 120 may be part of the infotainment system while the communication interface 125 and processing device 130 may be incorporated in a dongle or a mobile device such as a cell phone or tablet computer.

Autonomous mode controller 135 is configured to operate the vehicle 100 in a driverless or fully autonomous mode. When operating in an autonomous mode the vehicle system 110 controls various vehicle subsystems including steering, braking and throttle via various sensors and actuators. Autonomous mode controller 135 interfaces with navigation system 120 to direct vehicle 100

The user interface device 115 may be configured to receive vehicle operator inputs regarding the vehicle operator's risk tolerance for receiving a parking ticket. These inputs can be received directly through the infotainment system or through the vehicle operator cell phone 109. Vehicle operator cell phone 109 may also or in the alternate communicate information regarding the vehicle operator's risk tolerance for receiving a parking ticket. Examples of user inputs may include a time threshold that the vehicle operator may wish the vehicle to wait in an expired parking location before the processing device 130 instructs the vehicle 100 to move. The vehicle operator may communicate with the vehicle processor through cell phone 109 to instruct the vehicle to move to a pickup location or maintain the current vehicle location and risk a ticket.

The user interface device 115 may make the user inputs available to other components of the vehicle system 110. The user interface may include a touch display that prompts the vehicle operator to solicit information regarding the vehicle operator's risk tolerance for a parking ticket. The user interface device 115 or the cell phone 109 solicits information regarding when and where a user wishes to be picked up and/or the vehicle operator's cost and/or location preferences for a new parking spot. The vehicle operator's desire to move to a new location, information about the vehicle operator's risk tolerance for a ticket and/or the location where a vehicle operator desires to be picked up may be shared with the navigation system 120 and autonomous mode controller 135, for example. The vehicle operator's preferences are shared with the communication interface 125 and processing device 130. Data representing the user inputs is stored in a memory device accessible to, e.g., the navigation system 120, the communication interface 125, and the processing device 130. The memory may be associated with the processing device. Alternatively, the user interface device 115 may transmit certain user inputs directly to one or more of these other components.

The navigation system 120 is configured to determine a current location of the vehicle 100. The navigation system 120 may include a Global Positioning System (GPS) receiver configured to triangulate the position of the vehicle 100 relative to satellites or terrestrial based transmitter towers. The navigation system 120 may be further configured to develop routes from the current location to a pickup location or a new parking location. The vehicle operator cell phone 109 may be in communication with the vehicle system 110 so that the vehicle operator is informed about the location and activities of the vehicle 100.

The navigation system 120 may be configured to further develop routes to circle the vehicle 100 to a pickup location, or to a new parking location. In the event a new parking location is desired by the vehicle operator or included in an instruction signal generated by the processing device, the parking server 105 may transmit directions to the parking location to the vehicle 100. The directions may include an address, intersection, GPS coordinates, etc. The navigation system 120 may be configured to generate a route from the current location of the vehicle 100 to the new location. The route may be part of the instruction signal sent to the autonomous mode controller 135. Once the vehicle 100 has moved the to the new parking location the communication interface 125 communicates the new location to the vehicle operator cell phone 109 so that the vehicle operator is aware of the vehicle location.

The communication interface 125 is configured to facilitate wired and/or wireless communication between the components of the vehicle and other devices, such as the parking server 105, parking meter 107 and vehicle operator cell phone 109. The communication interface 125 may also be configured to communicate directly with a mobile device using any number of communication protocols such as Bluetooth®, Bluetooth® Low Energy, or WiFi. Accordingly, the communication interface 125 may be configured to send messages to the parking server 105. The messages may include information regarding the vehicle operator's desire for a new parking location. As noted, the communication interface 125 may also communicate with parking meter 107 and vehicle operator cell phone 109. The processing device may calculate a new parking location based on vehicle operator location and cost preferences.

The processing device 130 is configured to process signals including vehicle operator inputs received via the user interface device 115, vehicle operator cell phone 109, signals output by the navigation system 120, and messages received from the parking server 105 or parking meter 107. The processing device 130 may be configured to determine how far the vehicle 100 is from a pickup location or new parking location.

Figure 3A:
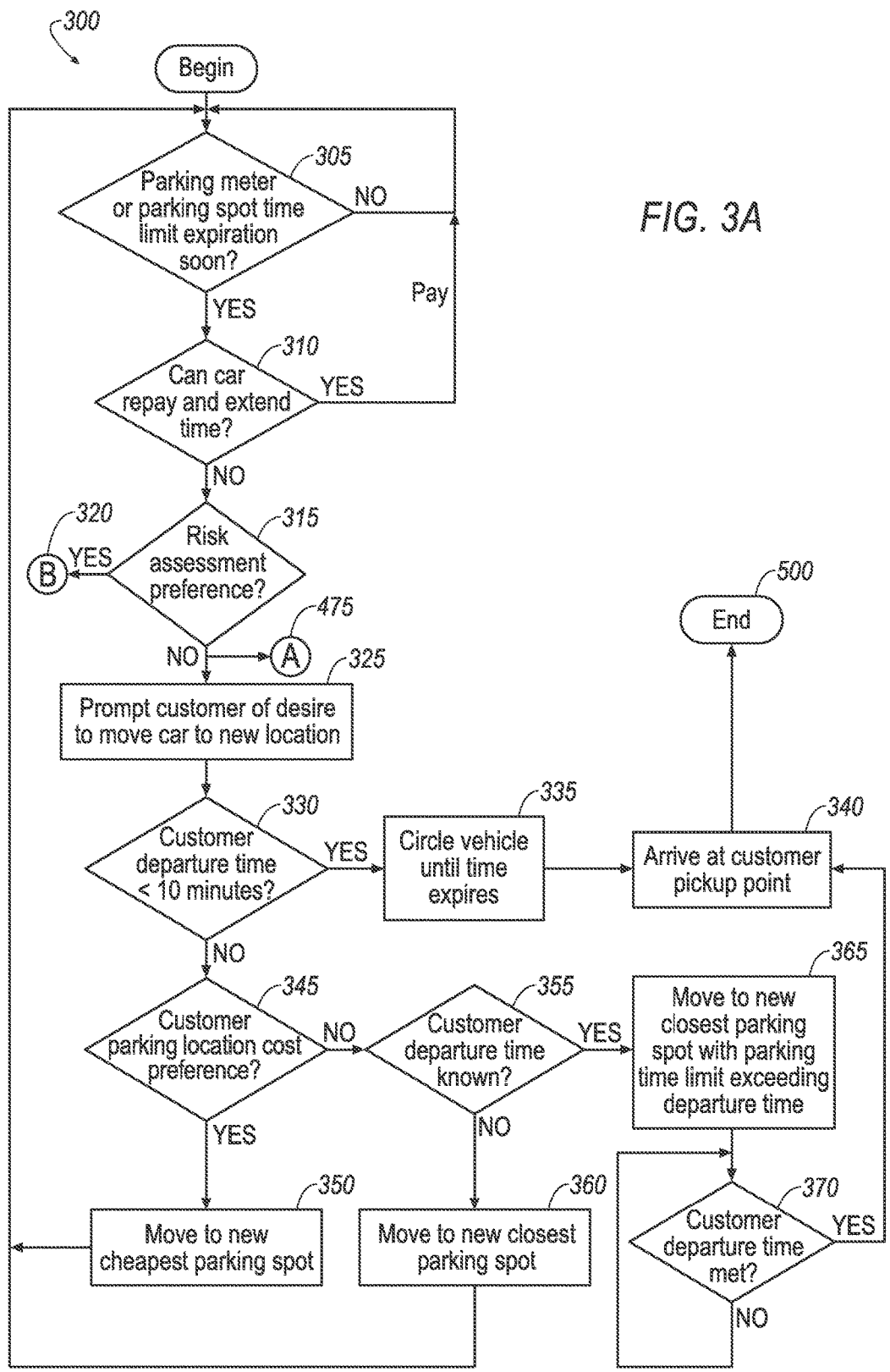
FIG. 3A is a flowchart of an example process that may be executed by one or more components of the vehicle system of FIG. 2.

FIG. 3 is a flowchart of an example process 300 that may be implemented by one or more components of vehicle system 110.

The process begins at block 300. At block 305 the processing device 130 receives information from parking meter 107 and determines whether a parking meter is set to expire within a predetermined time threshold. This time threshold for example may be 5-20 minutes. The threshold time may also be set by a user preference and communicated through user interface device 115 or cell phone 109. If the time is set to expire within the threshold processing device 130, in communication with parking meter 107 or parking server 105, determines whether additional time may be purchased as referenced at block 310. If additional time may be purchased at block 310 the processing device 130 will not make a query until the time at parking meter 107 is set to expire at block 305.

If additional time is not available for purchase at block 310, processing device 130 inquires as to whether there is a vehicle operator risk assessment preference at block 315. The risk assessment preference is noted at reference 320, where process moves to the risk assessment process flow illustrated in FIG. 3B.

Figure 3B:
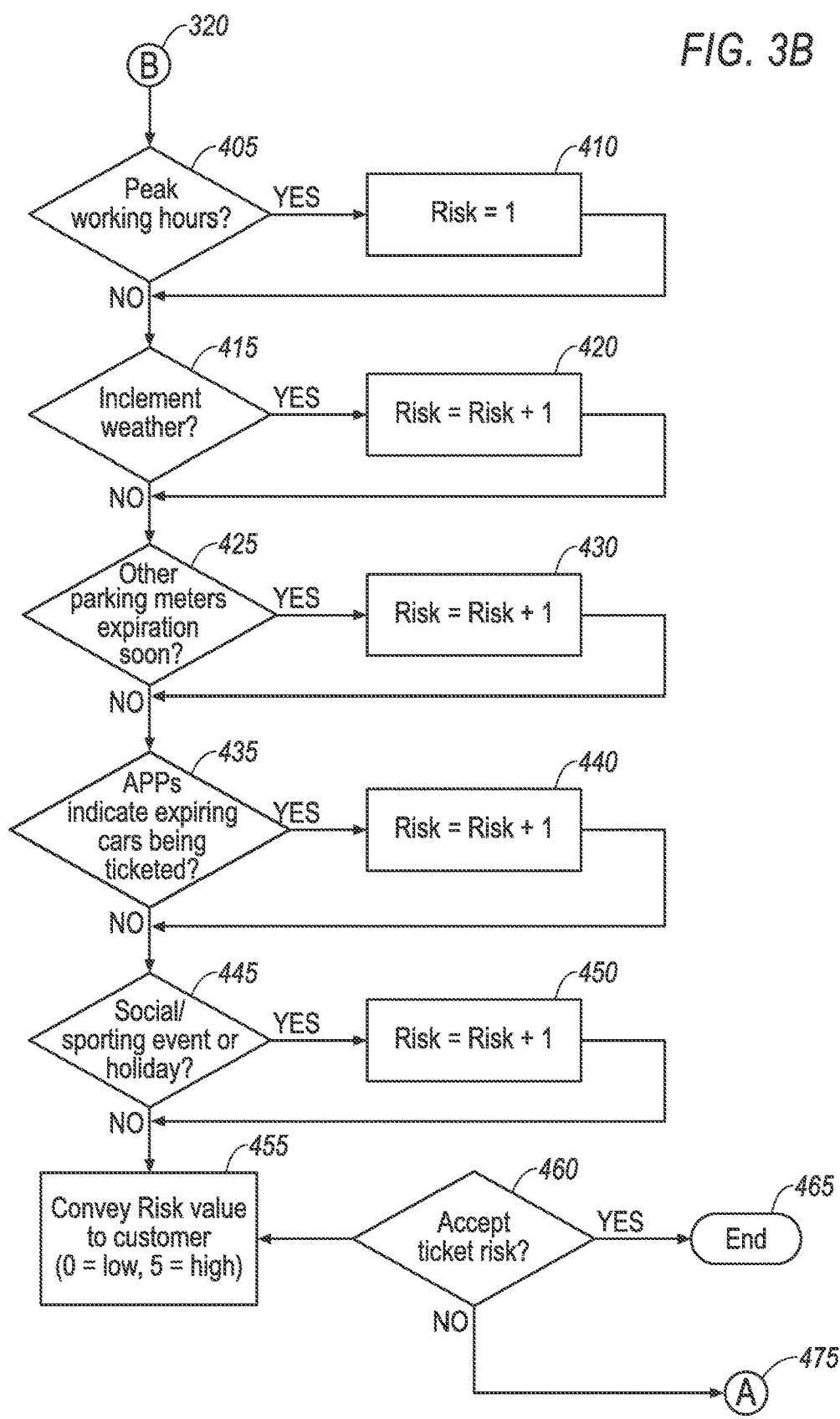
FIG. 3B is a flowchart of vehicle operator risk assessment preference.

With reference to FIG. 3B the vehicle operator risk assessment begins at reference 320. At block 405, the processing device determines whether the parking meter is set to expire during peak work hours. If processing device 130 determines that the meter 107 is set to expire during peak work hours a risk value is set at the value of 1 as noted at block 410. If the processing device determines that it is not peak hours, the risk value is set at a value of zero. The vehicle operator risk assessment may also include evaluation of other risk factors as noted in FIG. 3B and those other risk factors may be additive. For example, at block 415 the processing device 130 inquires whether the weather is inclement. Where the weather is inclement it is assumed that demand for parking may be higher and tickets more likely, thus the prior risk value is elevated by 1 at block 420. For example, if the risk value was 1 previously, because the processing device determined that it was peak working hours, a determination that the weather is inclement will add 1 to the Risk value making it a total of 2.

At block 425 processing device 130 in communication with parking server 105 determines whether other parking meters are expiring soon. If many parking meters are expiring, it may be more likely that a meter maid may be dispatched to give tickets. In such a case the processing device 130 adds another value of 1 to the risk value at block 430. At block 435 the processing device 130 inquires through communication interface 125 and a parking server 105 or some other source whether other vehicles in the area are being ticketed for having an expired meter. If other vehicles are being ticketed the processing device 130 adds another unit to the risk value as noted at block 440. As noted in FIG. 4 the added unit where other vehicles are ticketed is 1. As an alternate if other vehicles in the area are being ticketed the risk value may default to its maximum high risk value. At block 445 the processing device inquires whether it is a social/sporting event or holiday. If the query at block 445 is answered yes another unit is added to the risk value at block 450 by the processing device 130.

As noted at block 455 the risk value may be conveyed to the vehicle operator as a high risk or a low risk. As noted, a risk value of 5 may be defined as high, where a risk value of zero may be defined as low. The risk value is communicated to the vehicle operator through communication interface 125 to the vehicle operator cell phone 109. The vehicle operator may accept the risk at block 460. If the vehicle operator accepts the risk of ticket at block 460, the processing device 130 ends the process flow at block 465. If the vehicle operator does not accept the risk of ticket at block 460 the flowchart continues as referenced by number 475, the process continues as referenced in FIG. 3A.

If the vehicle operator does not accept the risk of getting a ticket the processing device 130 may prompt the vehicle operator whether the vehicle operator desires to move the vehicle 100 to a new parking location, or whether the vehicle operator expects to return to the vehicle shortly, for example within 10 minutes. If the vehicle operator responds that that departure is expected within the next 10 minutes or less, by way of example, the processing device 130 may instruct the vehicle to circle at block 335 and eventually arrive at a pickup point at block 340. In such an instance processing device 130 will generate and send an instruction signal to autonomous mode controller 135 which will operate to move the vehicle 100. As noted, when the vehicle arrives at the pickup point as noted at block 340, processing device 130 communicates with vehicle operator cell phone 109 to alert the vehicle operator that the vehicle 100 has arrived at a pickup location The vehicle operator may provide the location for the pickup point via the vehicle operator cell phone 109 in communication with communication interface 125. Once the vehicle operator is picked up at the pickup point the process ends at block 500.

If the vehicle operator departure time exceeds the threshold, processing device 130 generates an instruction signal to the autonomous mode controller to direct the vehicle 100 to a new parking location. As noted at block 345 the processing device will query as to whether the vehicle operator has input a parking location cost preference. If the vehicle operator has indicated that there is a cost preference, the processing device 130 will generate an instruction signal to the autonomous mode controller 135 to move the vehicle 100 to the cheapest available parking location within a predetermined radius of the current vehicle location. The cheapest available parking location can be identified by the processing device through communication with parking server 105. The processing device 130 may communicate the new parking location to the vehicle operator via vehicle operator cell phone 109.

If the vehicle operator does not have a cost preference at block 345, processing device 130 will query as to whether the vehicle operator departure time is known at block 355. If the vehicle operator does not have a departure time at block 355 processing device 130 will communicate with parking server 105 to locate the nearest available parking location and the processing device 130 will generate an instruction signal which will be sent to the autonomous mode controller to move to the nearest available parking location at block 360. If the vehicle operator departure time is known, the processing device 130 in communication with the parking server 105 will generate an instruction signal to the autonomous mode controller 135 to move the vehicle 100 to the nearest available parking location with time remaining on the parking meter as noted at block 365.

If the vehicle operator departure time is known the processing device 130 will wait until the vehicle operator departure time is met at block 370. The processing device 130, together with navigation system 120 will calculate a time to arrive at a vehicle operator pickup location and depart the parking location at block 370 to arrive at the pickup point at block 340 to pick up the vehicle owner. The processing device 130 will generate an instruction signal and send it to the autonomous mode controller to move the vehicle 100 to the location. When the vehicle owner is picked up the process flow ends at 500.

In general, computing systems and/or devices discussed above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on board vehicle computer, a computer workstation, a server, a desktop, notebook, laptop, or handheld computer, or some other computing system and/or device.

Computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media.

A computer readable medium (also referred to as a processor readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A vehicle system comprising:
a communications interface that receives vehicle operator preferences from one of a cell phone and an infotainment system, and parking meter expiration information from a parking meter; a processing device configured to assess a ticketing risk, the ticketing risk determined from a plurality of factors which are additive, the factors selected from a list including peak working hours; inclement weather; other parking meters expiring soon; an APP indicating expiring cars being ticketed; and a social/sporting event or holiday, the processing device configured to generate an instruction signal, where the instruction signal is a function of the ticketing risk; and an autonomous mode controller configured to receive the instruction signal and operate a vehicle as a function of the instruction signal.

2. A vehicle system as in claim 1 where the instruction signal directs the autonomous mode controller to move the vehicle to a new parking spot based on a cost preference.

3. A vehicle system as in claim 1 where the instruction signal directs the autonomous mode controller to circle the vehicle.

4. A vehicle system as in claim 1 where the instruction signal directs the vehicle to move to a new parking spot.

5. A vehicle system as in claim 4 where the instruction signal directs the vehicle to move a new parking spot based on price.

6. A vehicle system as in claim 1 wherein the communication interface is a cell phone.

7. A vehicle system as in claim 1 wherein the instruction signal is a function of at least one of peak working hours, inclement weather, other parking meters, other cars being ticketed and current local events.

* * * * *